US012330456B2

(12) United States Patent
Epler et al.

(10) Patent No.: US 12,330,456 B2
(45) Date of Patent: Jun. 17, 2025

(54) TOWABLE ASSET WITH AUTOMATED MONITORING

(71) Applicant: Phillips Connect Technologies LLC, Santa Fe Springs, CA (US)

(72) Inventors: Jim Epler, Irvine, CA (US); Adam Bean, Hacienda Heights, CA (US); Gil Winograd, Santa Fe Springs, CA (US)

(73) Assignee: Phillips Connect Technologies LLC, Santa Fe Springs, CA (US)

( * ) Notice: Subject to any disclaimer, the term of this patent is extended or adjusted under 35 U.S.C. 154(b) by 268 days.

(21) Appl. No.: 17/890,916

(22) Filed: Aug. 18, 2022

(65) Prior Publication Data

US 2022/0388360 A1 Dec. 8, 2022

Related U.S. Application Data

(63) Continuation of application No. PCT/IB2021/051563, filed on Feb. 25, 2021.

(60) Provisional application No. 62/980,011, filed on Feb. 21, 2020.

(51) Int. Cl.
*B60D 1/64* (2006.01)
(52) U.S. Cl.
CPC ..................... *B60D 1/64* (2013.01)
(58) Field of Classification Search
CPC ........................................ B60D 1/64
USPC ......................................... 340/431
See application file for complete search history.

(56) References Cited

U.S. PATENT DOCUMENTS

| 6,120,052 | A | 9/2000 | Capik et al. |
| 6,222,443 | B1* | 4/2001 | Beeson ............... B60D 1/62 |
| | | | 340/539.1 |
| 8,115,620 | B2* | 2/2012 | Breed ............... G01S 17/88 |
| | | | 340/541 |
| 10,173,486 | B1* | 1/2019 | Lee ................. G08G 1/202 |
| 2004/0224630 | A1 | 11/2004 | MacFarland |
| 2006/0044122 | A1* | 3/2006 | Dialinakis ............ B60D 1/36 |
| | | | 348/148 |
| 2009/0072956 | A1* | 3/2009 | Kalous ............... B60Q 1/305 |
| | | | 340/687 |
| 2013/0147617 | A1* | 6/2013 | Boling ............. G06Q 10/0833 |
| | | | 340/431 |
| 2014/0145837 | A1* | 5/2014 | Douglas ............ B60Q 1/305 |
| | | | 340/431 |
| 2016/0023587 | A1* | 1/2016 | Bean ................ B60Q 1/305 |
| | | | 340/431 |

(Continued)

FOREIGN PATENT DOCUMENTS

WO 2018/156179 A1 8/2018

OTHER PUBLICATIONS

Extended European Search Report and European Search Opinion—PCT/IB2021051563—Nov. 6, 2024, 9 pages.

*Primary Examiner* — Omar Casillashernandez
(74) *Attorney, Agent, or Firm* — Haynes and Boone, LLP

(57) ABSTRACT

An automated asset monitoring system is provided for a towable asset. The system includes a power supply voltage that may be converted to power a monitored circuit during an active mode of operation while the towable asset is not connected to a tractor. The system powers the monitored circuit during the active mode so that a message regarding an operating condition of the monitored circuit may be transmitted by a telematics transceiver to a remote user.

12 Claims, 7 Drawing Sheets

(56) References Cited

U.S. PATENT DOCUMENTS

2018/0099712 A1\* 4/2018 Bean ................. G05B 19/4185

\* cited by examiner

TOWABLE ASSET WITH AUTOMATED MONITORING

CROSS-REFERENCE TO RELATED APPLICATIONS

This application claims the benefit of International Application No. PCT/IB2021/051563, filed Feb. 25, 2021, which in turn claims the benefit of U.S. provisional Application No. 62/980,011, filed on Feb. 21, 2020, the contents of both of which are hereby incorporated herein by reference in its entirety.

TECHNICAL FIELD

The present invention relates to the monitoring of a towable asset, and more particularly, to an automated monitoring of a towable asset.

BACKGROUND

The design of the tractor in a tractor-trailer varies depending upon the region but regardless of the design, it is conventional to use a J-560 interface (commonly referred to as a 7-way coupler) on the semi-trailer or other type of towable asset to ease the connection and disconnection of the trailer from the tractor. As implied by the name, a 7-way coupler includes 7 pins or terminals. One pin is for ground. The remaining six pins are conventionally used to drive the tail and running lights and marker light, the license plate lamp, an auxiliary circuit such as an anti-lock brake (ABS) unit, the left turn signal, the right turn signal, and the stop lights, respectively.

The proper functioning of these various lights and circuits is vital for public safety. Various monitors have thus been developed that may wirelessly report the operating status of the lights and circuits in the trailer. But the ease of integration of such monitors is an issue. Similarly, various telematic reporting systems have been developed for the trucking industry. Customers may have thousands of rigs so the costs of retrofitting them to include monitors and telematics must be minimized.

SUMMARY

In accordance with an aspect of the disclosure, an automated towable asset monitoring system having an active mode of operation in which a towable asset is not coupled through a 7-way interface to a tractor and an inactive mode of operation in which the towable asset is coupled through the 7-way interface to a tractor is provided that includes a battery; a power management circuit configured to convert a battery voltage from the battery to a monitored circuit power supply voltage; a controller configured to command the monitored circuit power supply voltage to power a monitored circuit in the towable asset during the active mode of operation and to prevent the monitored circuit power supply voltage to power the monitored circuit during the inactive mode of operation; and a telematics transceiver configured to transmit data regarding an operation of the monitored circuit during the active mode of operation to a user remote from the towable asset.

In accordance with another aspect of the disclosure, a method of monitoring a monitored circuit in a towable asset while the towable asset is without an auxiliary power from a tractor, the method comprising: generating a monitored circuit power supply voltage from a battery; powering the monitored circuit using the monitored circuit power supply voltage to cause the monitored circuit to operate; and transmitting data regarding an operating condition of the monitored circuit from a telematics transceiver to a user.

In accordance with yet another aspect of the disclosure, a system for monitoring a lamp in a towable asset is provided that includes: a rechargeable battery; a power management circuit configured to charge the rechargeable battery using auxiliary power while the towable asset is connected to a tractor, the power management circuit being further configured to generate a lamp power supply voltage during an active mode of operation in which the towable asset does not receive the auxiliary power; a monitoring circuit configured to measure the lamp power supply voltage and a current delivered to the lamp to determine an operating condition of the lamp; a controller configured to command the power management circuit to supply the lamp power supply voltage to the monitoring circuit during the active mode of operation, and a telematics transceiver configured to transmit a message regarding the operating condition to a user remote from the towable asset.

These and additional advantageous features of the disclosed embodiments may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
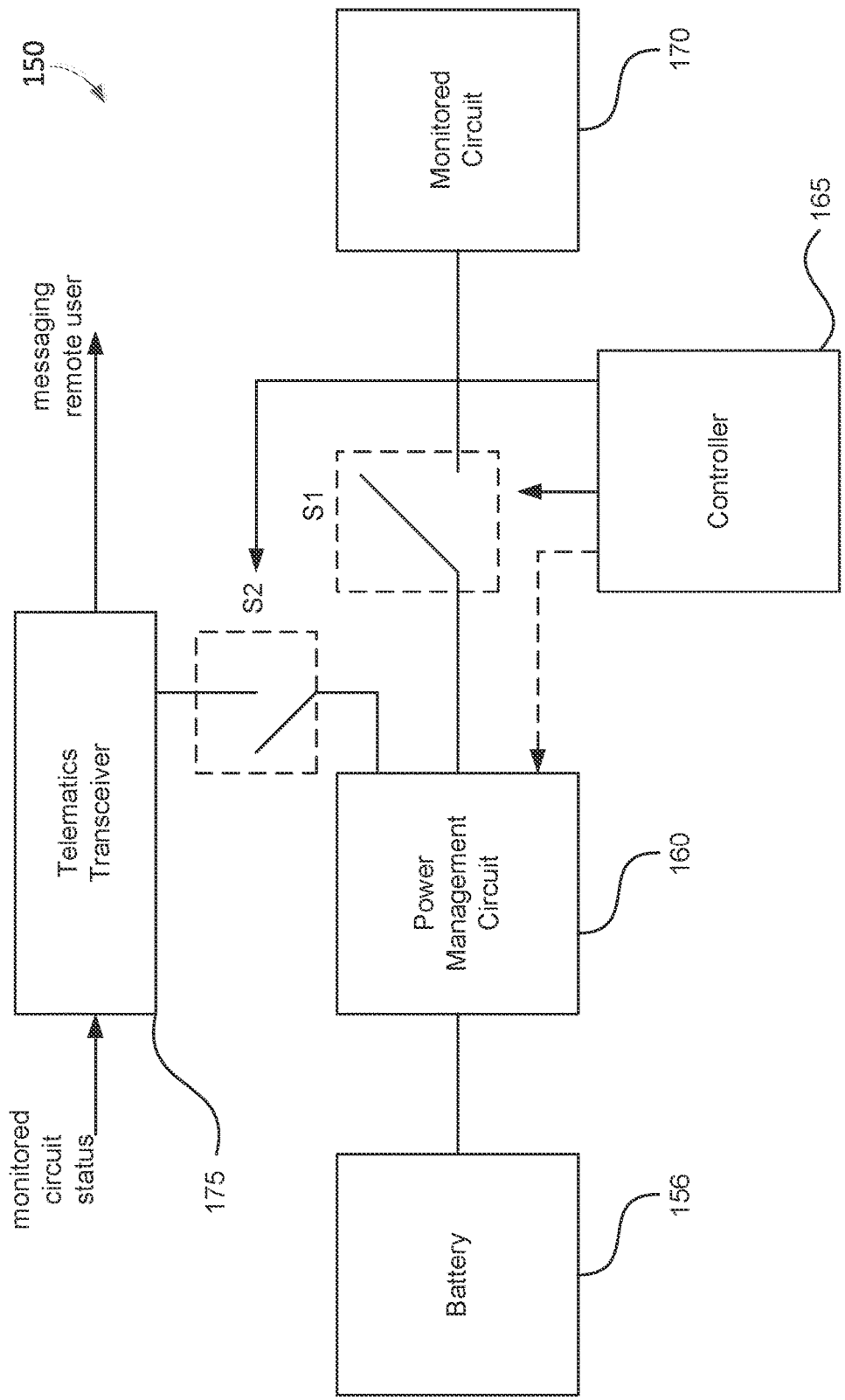
FIG. 1A is a high-level diagram of an automated asset monitoring system in accordance with an aspect of the disclosure.

To provide improved monitoring and telematics, an automated asset monitoring system is provided for the monitoring of a towable asset while the towable asset is not receiving the auxiliary power from a 7-way connection to the tractor in situations where the tractor is not connected to the towable asset. An example automated asset monitoring system 150 is shown in FIG. 1A. Through system 150, a user may remotely power various circuits within a towable asset despite the towable asset being disconnected from the tractor and thus without the auxiliary power provided by the tractor's J-560 coupler (commonly denoted as a 7-way coupler). A battery 156 functions as a power source for system 150 with regard to the selective powering and/or activation of a monitored circuit 170 in the towable asset. As used herein, the term "trailer" is used generically to refer to a semi-trailer, a chassis, a flat bed, or any other suitable towable asset that may be towed by the tractor and receive the tractor's 7-way coupler. In that regard, the terms "trailer" and "towable asset" are used interchangeably herein.

The monitored circuit 170 may be a lamp within the trailer such as one of the lamps discussed earlier that are powered by the 7-way connection to the tractor. These lamps are powered by a 12V power signal. Since battery 156 (e.g., a rechargeable battery such as a rechargeable lithium-ion battery) will typically provide a battery voltage that is lower than 12 V (e.g., 4 V), a power management circuit 160 may function as a DC-DC boost converter to boost the battery voltage to a 12 V power signal should the monitored circuit 170 be powered by a 12 V power supply. The following discussion will assume that each monitored circuit 170 is amenable to being powered by a 12 V power supply voltage as this is typical for trucking sensors. However, it will be appreciated that a monitored circuit 170 may require some other level of power supply voltage in alternative embodiments. In contrast to the monitored circuit 170, a telematics transceiver 175 will typically be powered by a telematics supply voltage that is lower than the battery voltage. For such assets, power management circuit 160 may function as a DC-DC buck converter to reduce the battery voltage to a telematics supply voltage for the telematics transceiver 175 and related circuitry. If, on the other hand, the telematics transceiver 175 may be powered by 12 V, power management circuit 160 need only provide the 12 V power supply voltage and would have no need of generating a telematics power supply voltage. In alternative embodiments, power management circuit 160 may generate more than two different power supply voltages depending upon the power voltage requirements of the various monitored circuits 170.

During a default state, system 150 is in a sleep mode to reduce power consumption. The awakening of system 150 may be responsive to a schedule. Alternatively, system 150 may awaken to check whether a user is commanding it to perform an automated monitoring of the monitored circuit(s) 170. In some embodiments, a controller 165 may trigger or command power management circuit 160 to awaken and begin producing its power supply voltage(s) such as the 12 V power supply voltage or the telematics power supply voltage. Alternatively, power management circuit 160 may continue to produce its power supply voltages even while system 150 is in the sleep mode. In such constantly-on embodiments, the application of the 12 V power supply voltage to the monitored circuit 170 may be gated by a switch S1 that is controlled by controller 165. Controller 165 would thus close switch S1 to activate the monitored circuit 170 so that its status may be determined and a resulting message about this status being transmitted by the telematics transceiver 175. But switch S1 would be unnecessary if instead the power management circuit 160 collapsed (discharged and did not power) its power supply voltages during the sleep mode and would only produce the monitored circuit's power supply voltage upon command from controller 165. A similar switch S2 on the telematics transceiver's power rail is also optional.

Since the power supply voltages for the telematic transceiver 175, the power management circuit 160, controller 165, and monitored circuit 170 are all ultimately derived from the battery power supply voltage during the active mode of operation for system 150, system 150 may advantageously monitor a series of monitored circuits 170 despite the absence of the auxiliary power from the tractor. The monitored circuit 170 may be a digital circuit such as a sensor. System 150 may then receive a status directly from the monitored circuit 170. Alternatively, system 150 may include a monitoring circuit as will be explained further herein that determines a status of a corresponding lamp in the towed asset. With the status determined through the selective powering of the monitored circuit 170, the telematics transceiver 175 may then transmit the status to a remote user. For example, if the telematics transceiver 175 is a cellular transceiver, the cellular transceiver may transmit the status to a corresponding base station and ultimately to the Internet (the "cloud") to the remote user.

The resulting automated monitoring is quite advantageous. For example, the system 150 may be used to check the status of each lamp in the trailer: e.g., first the brake lights, then the license plate light, and so on with the remaining lamps. In addition, various sensors or other digital circuits within the trailer may be powered (simultaneously if they share the same power rail) and monitored despite the absence of the auxiliary power. For example, a user may remotely monitor the status and data from an ABS module, a TPMS receiver, a cargo sensor, trailer lamps, a door sensor, and so on. In this fashion, system 150 may be used to fully or partially verify the operating status of all the lamps, sensors, modules, etc. within the trailer despite the trailer being disconnected from a tractor and without auxiliary power. A user may be assured of an operating status of the trailer before sending a tractor to connect to the trailer.

The following discussion will be directed to the adaptation of a nose box to include the automated asset monitoring system 150. However, it will be appreciated that the automated asset monitoring system 150 may be distributed or concentrated in other locations within the towable asset. The following discussion will thus be directed to a nose box implementation without loss of generality. The nose box integrates and protects the automated asset monitoring system 150. The following description will be directed to nose boxes compatible with the Phillips i-Box™ form factor or the Phillips S7™ form factor. However, it will be appreciated that any suitable nose box form factor may benefit from the principles and techniques disclosed herein.

Figure 1B:
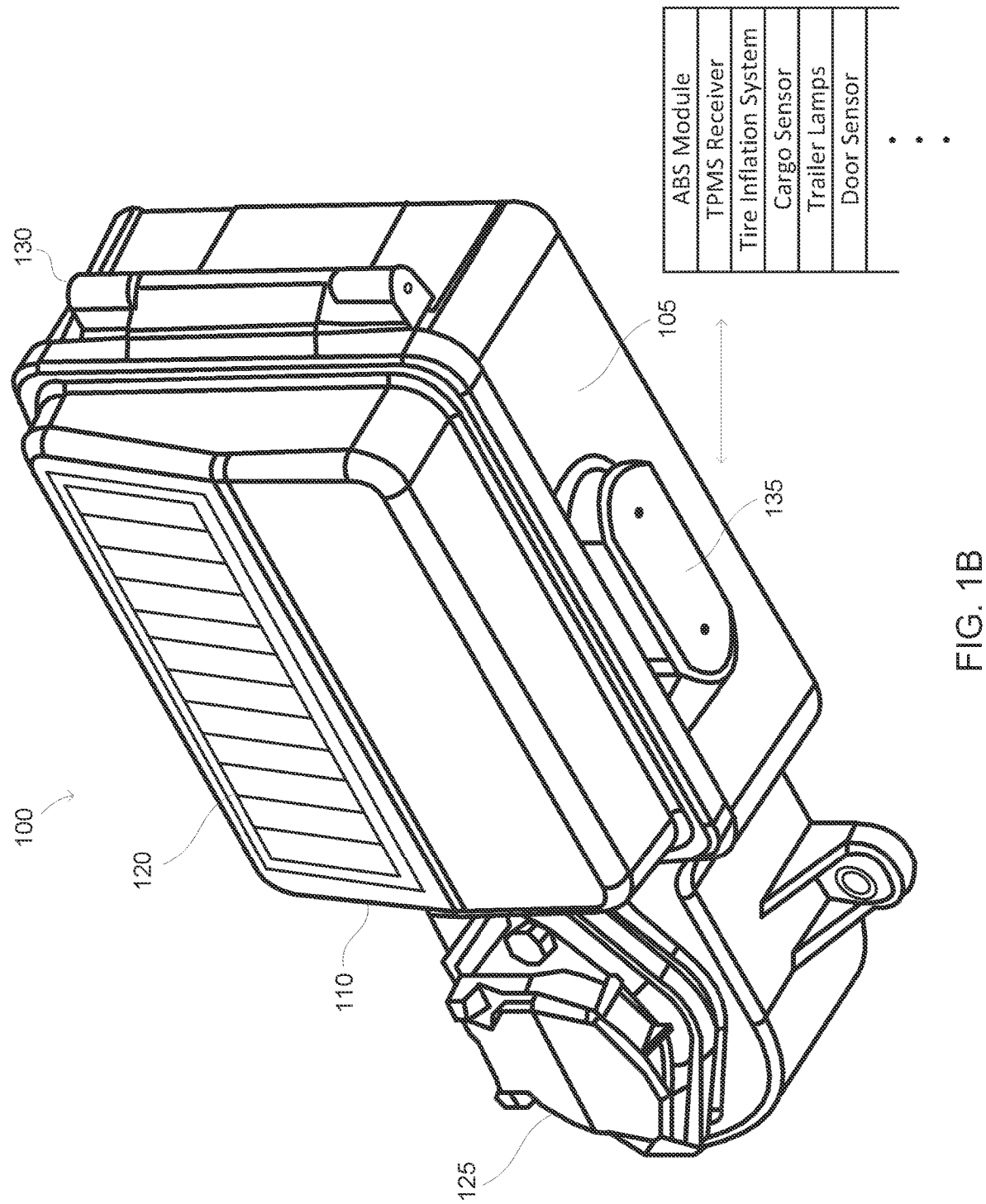
FIG. 1B is a perspective view of a nose box with automated asset monitoring in accordance with an aspect of the disclosure.

An example nose box 100 that is compatible with the Phillips i-Box™ form factor is shown in FIG. 1B. Due to the inclusion of the automated asset monitoring system 150 discussed with regard to FIG. 1A, nose box 100 may also be denoted as a "smart" nose box 100. A housing 105 includes a J-560 coupler such as a Phillips Quick-Change socket QCS2® 125 that when opened may receive a 7-way coupler from the tractor. As implied by the term "nose," smart nose box 100 is placed at the front of a trailer. Housing 105 includes a lid 110 that may be rotated away from housing 105 on an axis 130 to expose an inner surface of lid 110 and an interior of housing 105. Lid 110 may also include a solar panel 120 on its outer surface for recharging of a battery in smart nose box 100 as will be discussed further herein. In other embodiments, the solar panel may be remote from nose box 100. Battery 156 may thus be a rechargeable battery as recharged through the solar panel power while the auxiliary power is not available. When the towable asset is connected to the tractor, battery 156 may be recharged using the auxiliary power. Housing 105 includes a removable grommet 135 so that a 7-way harness and other leads may exit housing 105 and extend to their trailer destinations.

Smart nose box 100 is configured to power and monitor various monitored circuits 170 in the towable asset such as the ABS module, a tire pressure monitoring system (TPMS) receiver, a tire inflation system, a cargo sensor, a door sensor, and so on despite the absence of the auxiliary power. Information regarding the status or signals from these monitored circuits may be transmitted to a user by a telematics transceiver 175 (FIG. 1A) in smart nose box 100 as will be explained further herein. The status for a monitored circuit 170 may include whether the monitored circuit is operative, inoperative, open circuited, short circuited and so on. In addition, the status may include a message from a sensor such as whether the towable asset includes cargo, its weight, the tire pressure, the towable asset's location, and so on.

Figure 2:
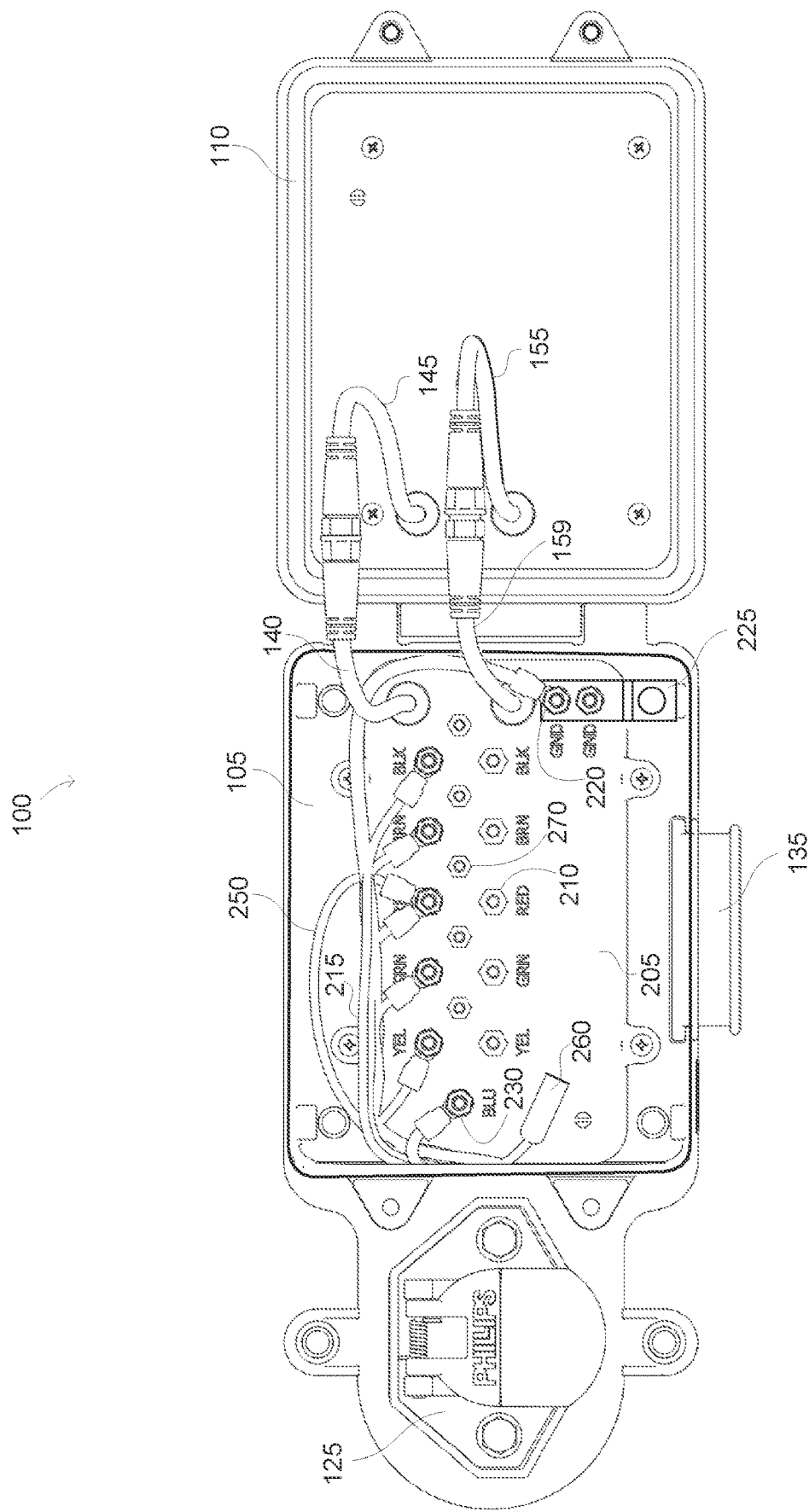
FIG. 2 is a plan view of the nose box of FIG. 1B with its lid opened in accordance with an aspect of the disclosure.

Nose box 100 is shown in FIG. 2 with the lid 110 opened away from housing 105 to expose a platform 205 in the interior of housing 105. Platform 205 seals and protects a housing circuit board as will be discussed further herein. Platform 205 is also a convenient location for a plurality of terminals 210. The following discussion will assume that terminals 210 are threaded posts so as to ease the attachment of a corresponding lead or wire by threadably engaging the posts with a corresponding nut but it will be appreciated that other types of terminals such as those requiring solder or a press fit may be used in alternative implementations. A 7-way wiring harness 215 is shown that connects between corresponding pins or terminals in the J-560 coupler 125 and corresponding posts 210 on platform 205. In some embodiments, there are three rows of posts 210. A top row of posts 210 receives the red, black, brown, green, and yellow wires from 7-way wiring harness 215. Each wire connects to a corresponding post 210. As known in the 7-way wiring arts, red is for the brake/stop lights, black is for the license plate lighting, brown is for the marker lights, green is for the left turn signal light, and yellow is for the right turn signal light. The corresponding lights in the trailer may also be denoted as lamps.

The top row of posts 210 receives the red, black, brown, green, and yellow wires from 7-way wiring harness 215. The red, black, brown, green, and yellow wires from a trailer 7-way wiring harness (not illustrated) connect to the bottom row of posts 210. The top row of posts 210 may thus be denoted as the upstream (tractor) posts whereas the bottom row of posts 210 may be denoted as the downstream (trailer) posts. This separation between upstream and downstream posts on the platform 205 is quite advantageous with regard to the monitoring of the corresponding lamps as will be further discussed herein.

The 7-way wiring harness 215 also includes a ground wire (which is typically colored white) that connects to a ground post 220. Platform 205 may include two ground posts 220 that are shorted to each other through a ground strap or plate 225. In addition, 7-way wiring harness 215 includes a blue wire (the auxiliary power lead) that couples to an auxiliary post 230 on platform 205 for powering an auxiliary circuit within the trailer. Because the tractor is not connected while system 150 is active, auxiliary post 230 does not have auxiliary power while system 150 functions in nose box 100 to monitor its monitored circuits 170. As discussed for posts 210, each of posts 220 and 230 may be threaded so that a wire fitting may be connected to the post by a nut or fastener that is screwed down on the threads. The blue wire in the 7-way wiring harness 215 as well as the corresponding blue wire in the trailer's 7-way wiring harness both share auxiliary post 230. This is advantageous with regard to an accurate monitoring of the brake lights as will be explained further herein.

Figure 3A:
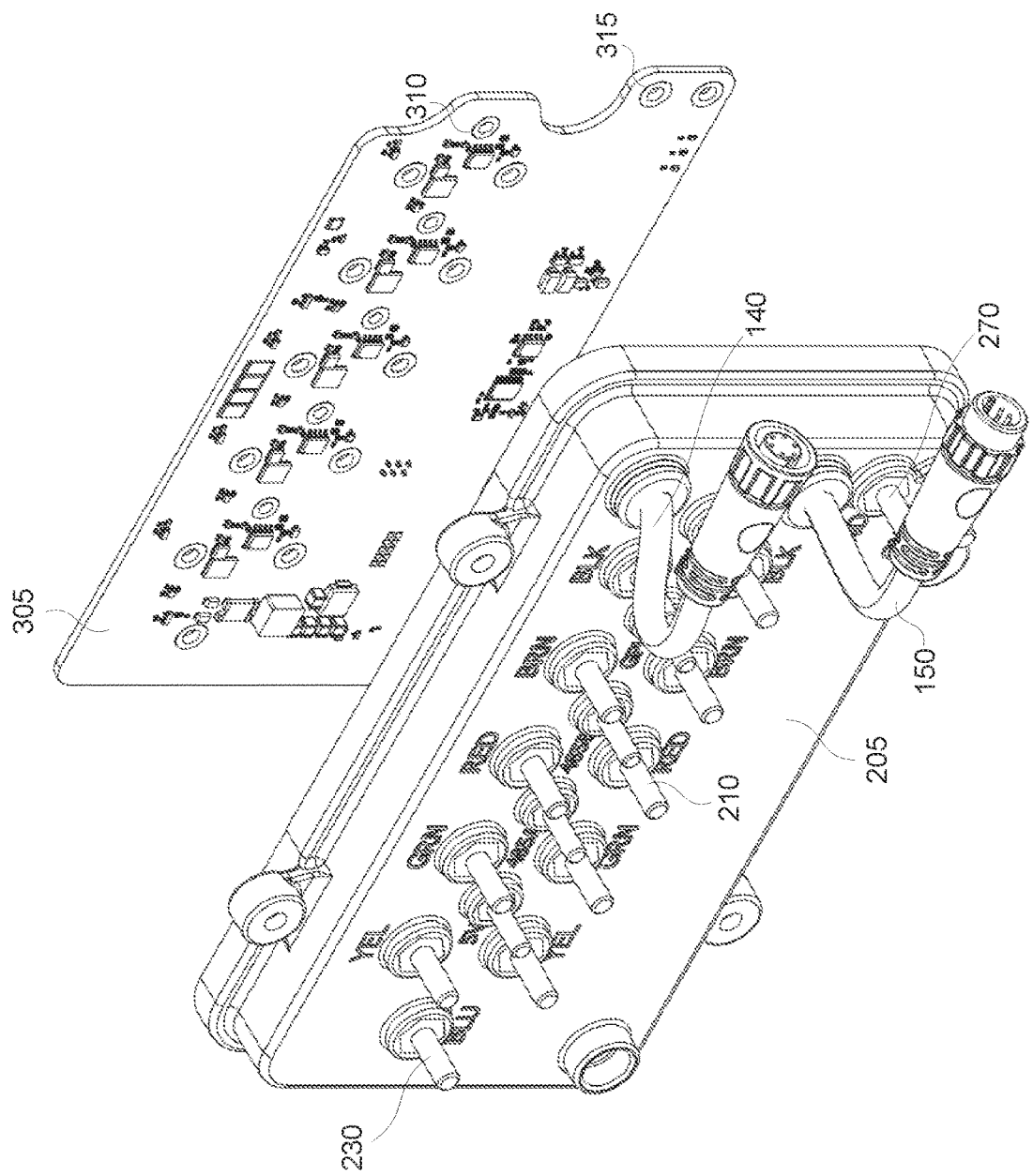
FIG. 3A is a perspective exploded view of a post platform and the associated circuit board for a nose box with automated asset monitoring in accordance with an aspect of the disclosure.
Figure 3B:
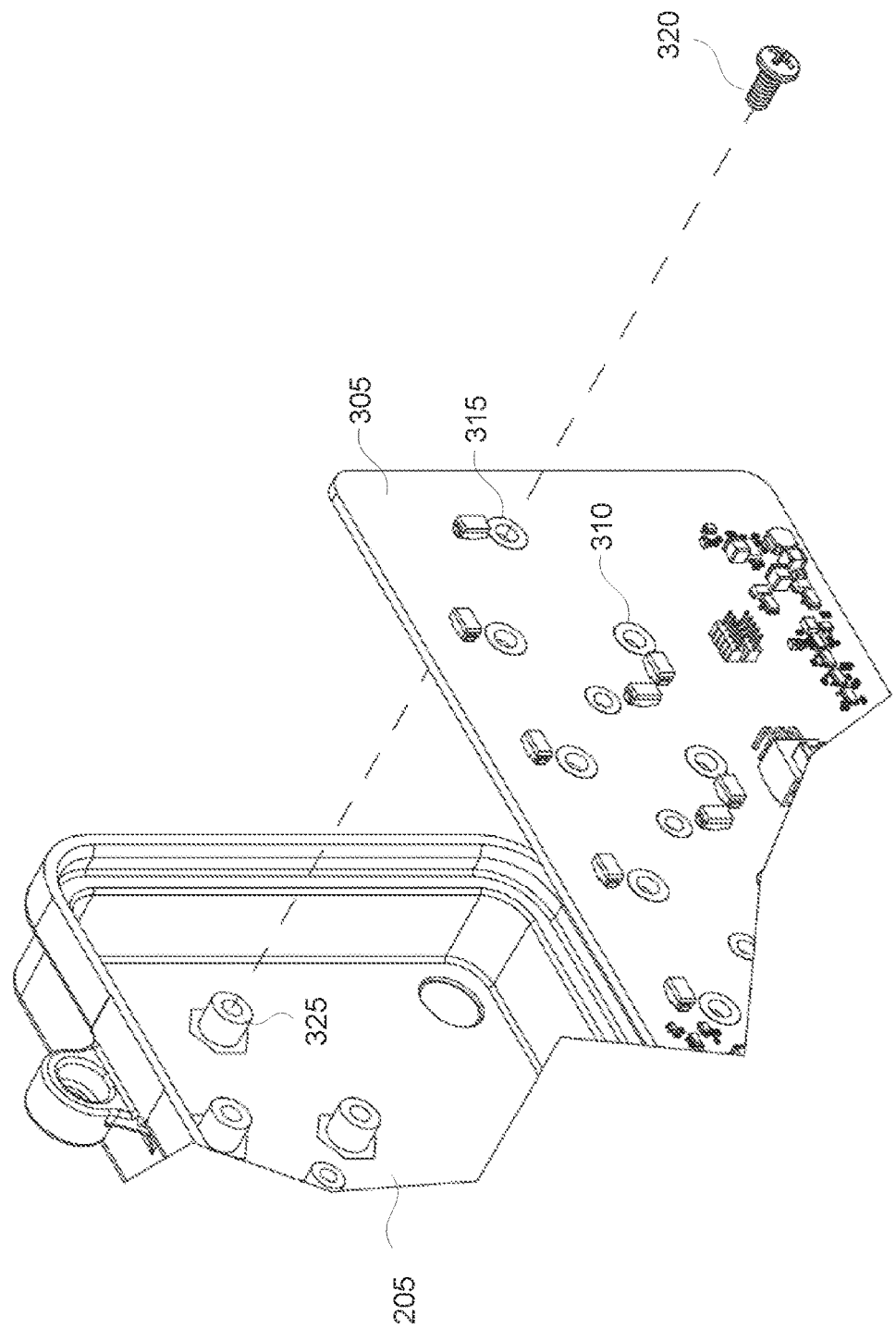
FIG. 3B is a perspective view exploded view, partially cut-away, of the trailer side of the post platform and circuit board of FIG. 3A.

A housing circuit board 305 is affixed to a back side of platform 205 as shown in the exploded view of FIG. 3A. Housing circuit board 305 includes a circular aperture 310 for each of posts 230, 210, and 220. Each circular aperture 310 is surrounded by a conductive ring 315 on housing circuit board 305. Platform 205 and housing circuit board 305 are shown in FIG. 3A from the perspective of the tractor. This side of the housing circuit board 305 may be denoted as the front side whereas a back side faces the trailer. A partially cut-away exploded view of the back side of housing circuit board 305 and platform 205 from the perspective of the trailer is shown in FIG. 3B. It may thus be seen that the posts extend through platform 205 to project from the backside of platform 205 and include threaded bores 325. Each post thus includes a back-side portion that includes a threaded bore 325. The back-side portion of each post is electrically connected to a front-side portion that extends above platform 205. A screw 320 for each post extends from the backside of housing circuit board 305 through an aperture 310 to be received in the post's threaded bore 325. As also seen in FIG. 3B, the backside of housing circuit board 305 may also include a conductive ring 315 surrounding each aperture 310. The resulting fastening of circuit board 305 to posts 210, 230, and 220 (FIG. 3A) is quite advantageous in that no soldering is necessary to electrically couple circuits on circuit board 305 to corresponding posts. Despite the lack of soldering, circuitry on both the front and back sides of housing circuit board 305 can electrically couple to each post through a circuit board contact to the corresponding conductive ring 315. Note that conductive rings 315 may be placed on just one circuit board surface around an aperture 310 in alternative embodiments as vias may be used that conduct from one side of the housing circuit board surface to another to allow circuitry on both sides of the housing circuit board to electrically couple to a conductive ring 315 and thus to the corresponding post. Note that the post platform 205 is configured to seal housing circuit board 305 within housing 105 to protect housing circuit board 305 from the elements. For example, a rim of post platform 205 may receive a gasket (not illustrated) to assist in the sealing of the rim of post platform 205 against a base of housing 105. Housing 105 may be denoted as a "tub" because of its shape. The open bore of the tub is then enclosed by lid 110.

Figure 4:
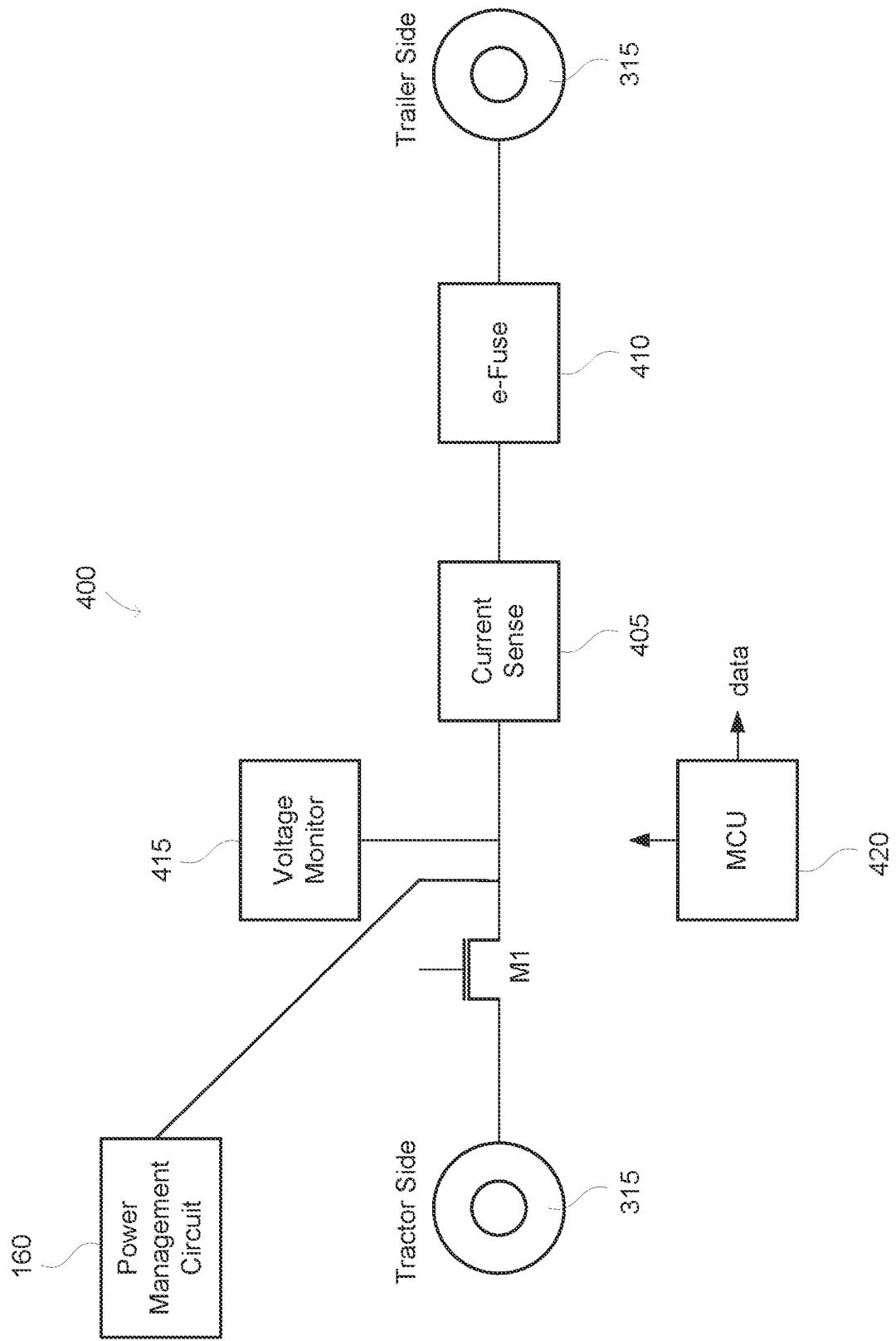
FIG. 4 illustrates a lamp monitoring circuit for the circuit board of FIGS. 3A and 3B in accordance with an aspect of the disclosure.

The electrical coupling to each post is advantageous with regard to monitoring the lamps using corresponding monitoring circuits on housing circuit board 305. For example, consider a monitoring (and activation) circuit 400 as shown in FIG. 4 that couples between a tractor-side conductive ring 315 (corresponding to one of the posts 210 in the top row of the posts in FIG. 2) to a trailer-side conductive ring 315 (corresponding to one of the posts 210 in the bottom row of the posts). Each monitoring circuit 400 would be integrated onto either the front side and/or the back side of housing circuit board 305. In monitoring circuit 400, each of the corresponding posts 210 would correspond to the same lamp. There would thus be a monitoring circuit 400 between the tractor-side and trailer-side red wire posts 210 for the brake lights, another for the marker lights between the tractor-side and trailer-side brown wire posts 210, and so on for the remaining lamps. Each monitoring circuit 400 includes a switch such as an NMOS transistor M1 that is upstream of a current sense circuit 405 and a voltage monitor 415. During normal operation (auxiliary power being present), a controller such as an micro-controller (MCU) 420 controls transistor M1 to be conductive so that the tractor may control whether the corresponding lamp is illuminated or not. But during operation of system 150, the auxiliary power is not present. When system 150 is active (and is monitoring the corresponding lamp), power management circuit 160 converts the battery voltage into the 12 V power supply voltage for the lamp being activated by monitoring circuit 400. To prevent current from traveling upstream at that time, controller 420 may maintain transistor M1 in an off state while system 150 monitors the lamp through monitoring circuit 400.

With the lamp powered on from the power supply voltage from power management circuit 160, a current sense circuit 405 measures the current supplied to the lamp since this current must pass through monitoring circuit 400 to drive the conductive ring 315 that ultimately couples to the lamp. Current sense circuit 405 may be a Hall sensor or may be a sense resistor. In addition, monitoring circuit 400 includes a fuse such as an e-fuse 410 to protect the trailer lamp from excessive currents.

In some embodiments, power management circuit 160 may couple to the lead between transistor M1 and the current sense circuit 405 through the switch S1 discussed with regard to FIG. 1A. During the automated monitoring of a lamp by system 150 in such embodiments, the power management circuit 160 provides the lamp power signal through the closed switch S1.

Another controller such as microcontroller (MCU) 420 on housing circuit board 305 determines the health of the lamp being driven by monitoring circuit 400 by monitoring the sensed voltage and the sensed current. Should the MCU 420 detect that the voltage is too low, a problem is detected with regard to the power supply voltage coming from the power management circuit 160. On the other hand, if the voltage is normal (typically 12 V) but the current is too low (or too high), either the corresponding lamp is malfunctioning or is broken. MCU 420 may then report the health of the corresponding lamp to a user using the telematics transceiver 175, which may be located in lid 110 as will be explained further herein.

Referring again to FIG. 2, note that the auxiliary post 230 is used to power an auxiliary circuit in the trailer such as an anti-lock-brake (ABS) module while the tractor is connected. The current draw of such a module is variable depending upon the mode of the ABS module. Housing circuit board 305 thus does not need a monitoring circuit 400 for auxiliary post 230 such that there is no need for a trailer-side auxiliary post 230 and a tractor-side auxiliary post 230. But housing circuit board 305 may include a voltage monitor to verify whether the auxiliary post 230 is receiving the proper voltage from the tractor (e.g., 12 V) while the trailer is connected to the tractor.

To provide extra robustness for powering an ABS module, it is known to power the ABS module through both the trailer's blue wire and its red wire. In this fashion, if the auxiliary power from the tractor is absent such as due to a blown fuse, the ABS module will still be powered every time the brakes are applied from the resulting powering of the trailer's red wire. To accommodate this practice, the trailer-side red post in the top row of posts as shown in FIG. 2 also couples to a wire 250 that ends in a coupler 260. A tractor-side wire (not illustrated) couples to coupler 260 and extends through grommet 135 to provide back-up power to the ABS module during normal operation (the tractor being connected to provide auxiliary power). Note that wire 250 does not couple to the trailer-side red post 210 because such a coupling would corrupt the current measurement by the monitoring circuit 400 for the brake lights should the ABS module draw power from the trailer's red wire instead of from the trailer's blue wire.

The voltage of auxiliary post 230 and the voltage/current health of the lamps as monitored by monitoring circuits 400 may be reported by MCU 420 to drive a data cable 140 that couples to a corresponding data cable 145 that is received by a telematics unit in lid 110. Various other data signals may also be propagated through data cables 140 and 145. A power and ground cable 159 couples from housing circuit board 305 to a coupler to drive a corresponding power and ground cable 155 for the telematics unit in lid 110. The telematics unit or circuitry within lid 110 is powered by battery 156 as converted through power management circuit 160 while system 150 is active.

Figure 5:
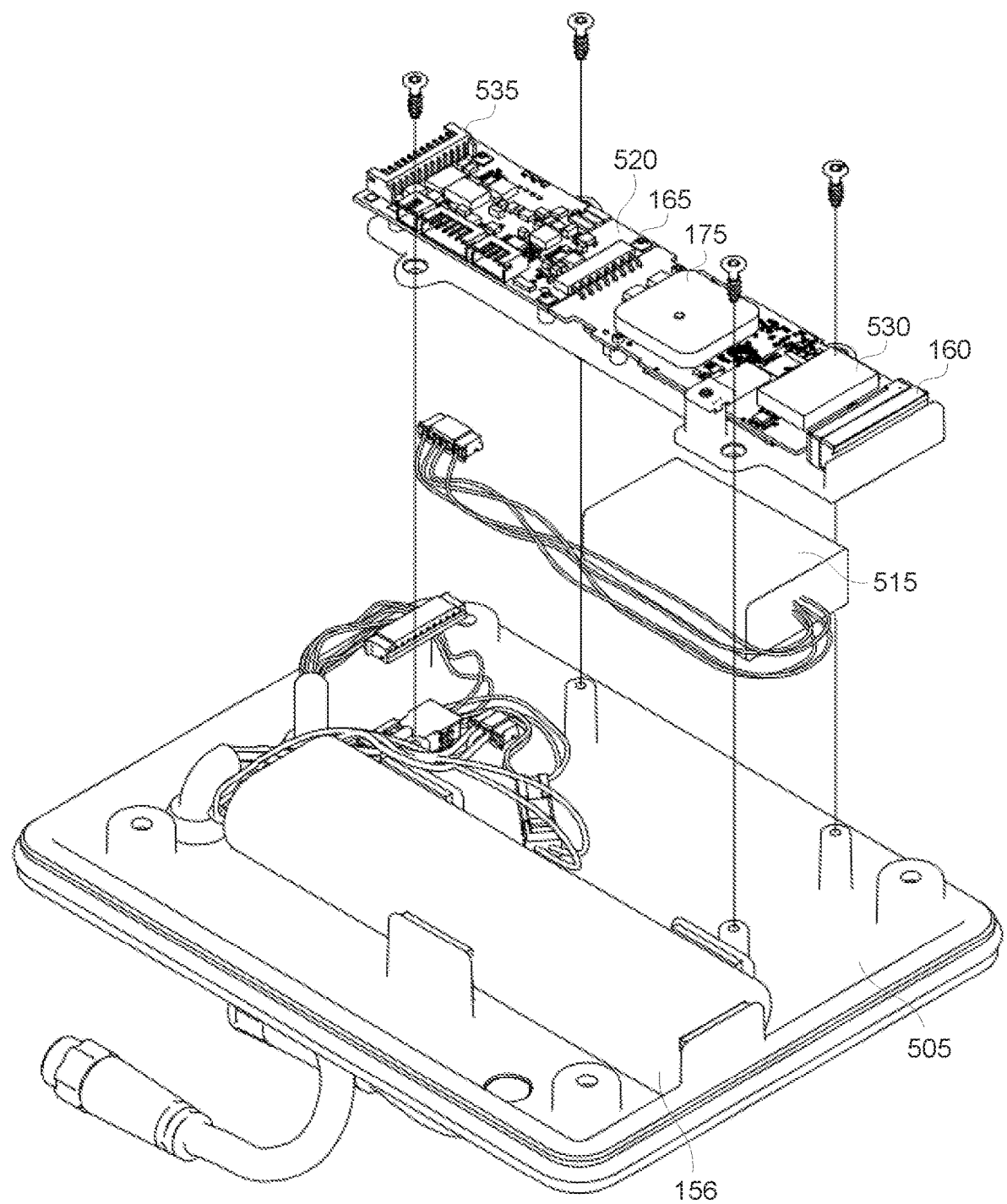
FIG. 5 is a trailer-side perspective exploded view of an inner cover for a nose box lid and associated circuitry in accordance with an aspect of the disclosure.

A trailer-side exploded view of an inner cover 505 for lid 110 is shown in FIG. 5. To allow the reporting of telematics and the operation of system 150 while the trailer is disconnected from a tractor, inner cover 510 supports the rechargeable battery 156 (e.g., a lithium-ion battery). A lid circuit board 520 is attached to inner cover 510 and includes the telematics transceiver 175. Any suitable wireless technology may be used for telematics transceiver 175 including cellular or WiFi. A cellular telematics transceiver 175 is particularly convenient due to the omnipresence of cellular coverage at virtually all warehouse locations and also due to the range of a cellular connection. The following discussion will thus assume that the telematics transceiver 175 is a cellular transceiver.

To conserve power, the default mode of the telematics transceiver 175 in the absence of the auxiliary power is a sleep mode in which the telematics transceiver 175 is powered down. Telematics transceiver 175 may be scheduled to periodically wake-up and check for commands to activate system 150 due to the receipt of a user command such as delivered over the internet (the "cloud") and then through a cellular connection to telematics transceiver 175. In receipt of this command, the system 150 may perform its automated asset monitoring. In addition, the telematics transceiver 175 may be scheduled to periodically wake up to selectively power a monitored circuit 170 to receive data or determine its status and transmit the data and/or status through the cellular link and through the cloud to a user. One form of data to report may be the position of the trailer such as determined through a GPS receiver 535 that is also integrated onto lid circuit board 520. In addition, lid circuit board 520 may include a local networking transceiver such as a Bluetooth transceiver 530 to receive data from Bluetooth-enabled sensors on the trailer. The trailer may include additional sensors and circuits that communicate with the controller (e.g., a MCU) 165 on lid circuit board 520 when activated by system 150.

With regard to this communication, platform 205 includes a center row of posts 270. A pair of posts 270 connect through housing circuit board 305 and data cables 140 and 145 to MCU 165. MCU 165 is configured to support a Control Area Network (CAN) bus transceiver for this pair of posts 270. A CAN bus routed from the trailer through grommet 135 may then be wired to this pair of posts 270 to couple to CAN-bus-enabled sensors in the trailer. Another pair of posts 270 may correspond to a RS 485 bus that is also routed to appropriate sensors in the trailer. Regardless of whether a sensor is connected to the RS 485 bus or to the CAN bus, the sensor may receive power from another one of posts 270 that functions as a sensor power post during the automated monitoring. For example, referring again to FIG. 1A, the activation of power management circuit 160 allows a 12 V power supply to energize the sensor power post and thus power the various monitored sensors. The CAN bus and the RS 485 bus is also routed through the corresponding posts 270 and through data cables 140 and 145 to MCU 165. In this fashion, a wide variety of sensors in the trailer may be networked to MCU 165 during the operation of system 150. For example, the TPMS receiver, a cargo sensor, a door sensor, a weight sensor, and so on may be powered and networked to MCU 165. Other sensors may be networked to MCU 165 through a Bluetooth connection with Bluetooth transceiver 530.

In addition to the coupling through the CAN and proprietary buses for receiving data and sensor status, the trailer's auxiliary lead may be used to transmit data and commands using a power line communications (PLC) module 515 during normal operation (the tractor being connected and providing auxiliary power). For example, the ABS module may report error conditions over the auxiliary lead to auxiliary post 230. Circuit board 305 receives auxiliary post 230 in a corresponding conductive ring 315 so that the auxiliary post PLC signaling may be coupled over data cables 140 and 145 to PLC module 515. PLC module 515 decodes the PLC signaling to provide the data to MCU 165 so that it may then be transmitted by the telematics transceiver 525 to a user in the cloud. Conversely, MCU 165 may transmit a query to PLC module 515 that is then translated to the PLC protocol and transmitted through data cables 140 and 145, circuit board 305, auxiliary post 230 and its corresponding ring 315 to the auxiliary lead in the trailer. The query may be a command to the ABS module to provide a status.

Regardless of the type of buses and whether PLC module 515 is included, note the advantages of the battery 156. Even with the trailer disconnected from the tractor's 7-way coupler or connected but with the auxiliary lead (the blue wire) in the tractor's 7-way coupler without power, telematics transceiver 525 may periodically wake up for an activity period to either listen for commands from a user such as downloaded from the cloud over a cellular link to the telematics transceiver 525 or to periodically wake up and provide a GPS location.

Lid circuit board 520 also contains the power management circuit 160. When auxiliary post 230 has power, power management circuit 160 may be configured to use auxiliary post power from auxiliary post 230 as routed through the corresponding conductive ring 315, housing circuit board 305, and power cables 159 and 155 to power the remaining electronics on. Since the auxiliary post voltage is 12 V, power management circuit 160 may include a DC-DC switching power converter such as a buck converter to convert the battery voltage into a lower, more suitable DC power supply voltage (e.g., a telematics power supply voltage) for the lid electronics.

Because the telematics circuitry may be integrated into lid 110, a user may retrofit a conventional nose box with lid 110 should the user not desire the monitoring of the lamps as discussed with regard to circuit board 305 in housing 105. The sensors will still be powered by the generated 12V power supply voltage during such an automated asset monitoring mode of operation. A conventional nose box housing may merely have the posts for a 7-way cabling to the trailer lamps and auxiliary circuit. Since there would be no sensor power post in such a conventional nose box house, power cable 155 may couple to an adapter to a trailer power lead to provide the generated 12 V power supply voltage during the automated asset monitoring mode of operation.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. An automated towable asset monitoring system having an active mode of operation in which a towable asset is not coupled through a 7-way coupler to a tractor and an inactive mode of operation in which the towable asset is coupled through the 7-way coupler to a tractor, the automated asset monitoring system comprising:
   a battery;
   a power management circuit configured to convert a battery voltage from the battery to a monitored circuit power supply voltage;
   a controller configured to command the monitored circuit power supply voltage to power a monitored circuit in the towable asset during the active mode of operation and to prevent the monitored circuit power supply voltage to power the monitored circuit during the inactive mode of operation;
   a telematics transceiver configured to transmit data regarding an operation of the monitored circuit during the active mode of operation to a user remote from the towable asset, wherein th system is integrated into a nose box that includes:
   a housing;
   a terminal platform within the housing, the terminal platform including a first plurality of terminals for receiving lamp power signals from the 7-way coupler, a second plurality of terminals for transmitting the lamp power signals to lamps in the towable asset; and
   a housing circuit board associated with the terminal platform, the housing circuit board including a plurality of lamp monitoring circuits, wherein the controller is further configured to force the power management circuit to supply an active one of the lamp monitoring circuits with the monitored circuit power supply voltage during the active mode of operation to power a respective one of the lamps in the towable asset through a respective terminal in the second plurality of terminals, the active one of the monitoring circuits being configured to measure a current and a voltage supplied to the respective one of the lamps to determine an operating condition of the respective one of the lamps, and wherein the data includes the operating condition.

2. The system of claim 1, further comprising:
   a lid for enclosing an interior of the housing, the lid including an inner cover configured to enclose the battery and a lid circuit board including the telematics transceiver, the controller, and the power management circuit.

3. The system of claim 2, further comprising:
   a solar panel, wherein the battery is a rechargeable battery configured to be recharged from power delivered by the solar panel during the active mode of operation.

4. The system of claim 1, further comprising:
   a sensor power terminal, wherein the controller is further configured to command the power management circuit to provide the monitored circuit power supply voltage to the sensor power terminal during the active mode of operation to power an at least one sensor in the towable asset.

5. The system of claim 4, further comprising a plurality of control area network (CAN) bus terminals, and wherein the controller is configured to receive a sensor signal through the plurality of CAN bus terminals from the at least one sensor, and wherein the data includes the sensor signal.

6. The system of claim 1, wherein the monitored circuit comprises at least one of a lamp, a cargo sensor, a tire pressure inflation system sensor, a trailer weight sensor, or a camera.

7. The system of claim 1, wherein the terminal platform is configured to seal the housing circuit board within the housing.

8. The system of claim 1, wherein the first plurality of terminals comprises a first plurality of posts and the second plurality of terminals comprises a second plurality of posts.

9. The system of claim 2, wherein the lid circuit board further includes a GPS receiver configured to be powered from the battery during the active mode of operation, and wherein the controller is further configured to control the telematics transceiver to periodically transmit a location from the GPS receiver during the active mode of operation.

10. A system for monitoring a lamp in a towable asset, comprising:
a rechargeable battery;
a power management circuit configured to charge the rechargeable battery using auxiliary power while the towable asset is coupled to a tractor, the power management circuit being further configured to generate a lamp power supply voltage during an active mode of operation in which the towable asset does not receive the auxiliary power;
a monitoring circuit configured to measure the lamp power supply voltage and a current delivered to the lamp to determine an operating condition of the lamp;
a controller configured to command the power management circuit to supply the lamp power supply voltage to the monitoring circuit during the active mode of operation,
a telematics transceiver configured to transmit a message regarding the operating condition to a user remote from the towable asset;
a first terminal for receiving the auxiliary power while the towable asset is connected to the towable asset; and
a second terminal for driving a lamp power lead connected to the lamp, wherein the monitoring circuit comprises a current sensor coupled between the first terminal and the second terminal and also comprises a switch coupled between the current sensor and the first terminal, wherein the controller is further configured to switch off the switch during the active mode of operation.

11. The system of claim 10, wherein the power management circuit is further configured to supply the lamp power supply voltage to a node in the monitoring circuit between the switch and the current sensor.

12. The system of claim 10, wherein the controller is further configured to switch on the switch while the towable asset is connected to the auxiliary power.

* * * * *